R. C. RACER.
DISK WHEEL FOR VEHICLES.
APPLICATION FILED MAR. 30, 1921.

1,382,672.

Patented June 28, 1921.
2 SHEETS—SHEET 1.

Inventor
R. C. Racer
By C. A. Snow & Co.
Attorneys

R. C. RACER.
DISK WHEEL FOR VEHICLES.
APPLICATION FILED MAR. 30, 1921.
1,382,672.
Patented June 28, 1921.
2 SHEETS—SHEET 2.
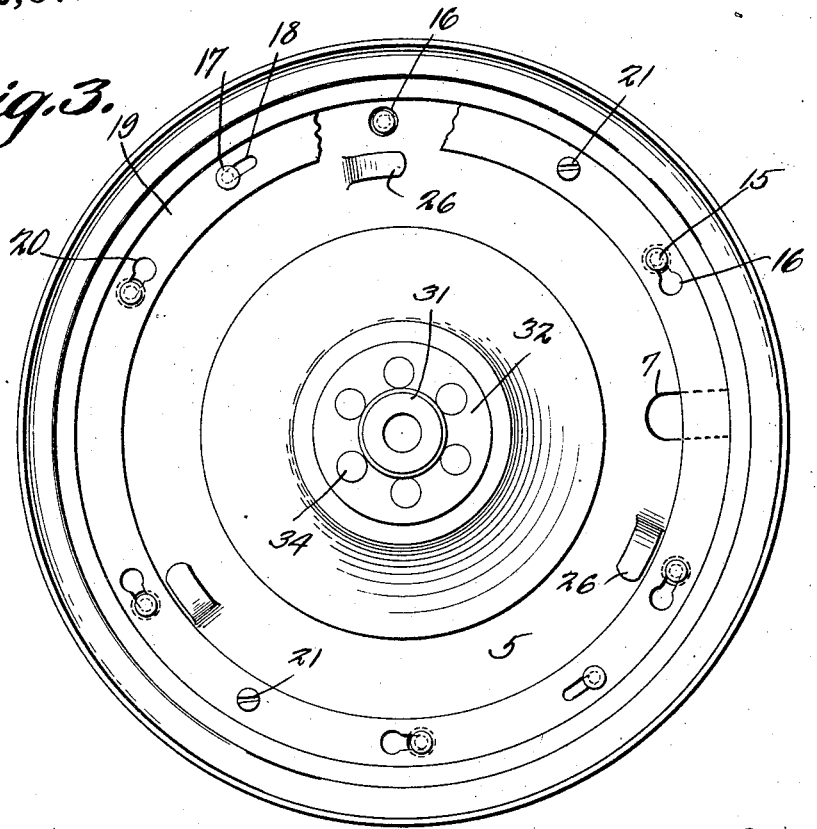
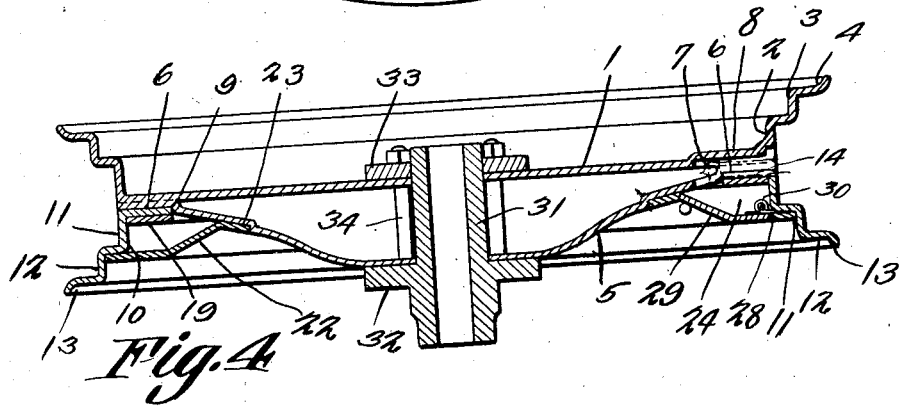
Inventor,
R. C. Racer
By C A Snow & Co
Attorneys.

UNITED STATES PATENT OFFICE.

ROSCOE CONKLIN RACER, OF RICHMOND, VIRGINIA.

DISK WHEEL FOR VEHICLES.

1,382,672.  Specification of Letters Patent.  Patented June 28, 1921.

Application filed March 30, 1921. Serial No. 456,990.

*To all whom it may concern:*

Be it known that I, ROSCOE C. RACER, a citizen of the United States, residing at Richmond, in the county of Henrico and State of Virginia, have invented a new and useful Disk Wheel for Vehicles, of which the following is a specification.

This invention relates to disk wheels for vehicles, one of its objects being to provide a wheel which can be readily stamped from metal, said wheel including means whereby a tire can be readily connected thereto and removed therefrom, the construction of the parts being such that they can be readily separated even after long subjection to the action of the elements, thus enabling tires to be changed easily at any time.

A further object is to provide a wheel so constructed as to be reinforced against lateral distortion.

A still further object is to provide a wheel which normally houses the valve tube of the tire so as to protect it from the weather, said tube being readily accessible whenever desired through the outer side of the wheel so that the inner tube can be inflated readily without requiring the user to reach under the vehicle, as has generally been the case heretofore.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Fig. 3 is a side elevation of the wheel with the covering ring removed.

Fig. 4 is a section on line 4—4, Fig. 1.

Figure 1:
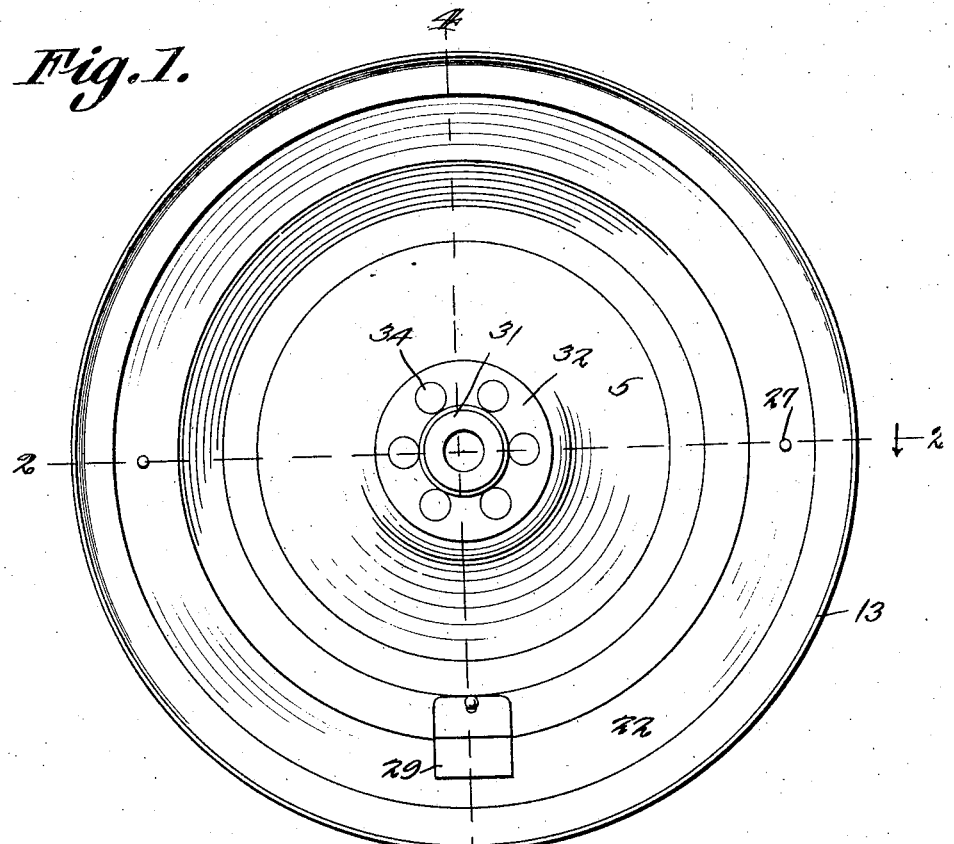
Figure 1 is a side elevation of the wheel.
Figure 2:
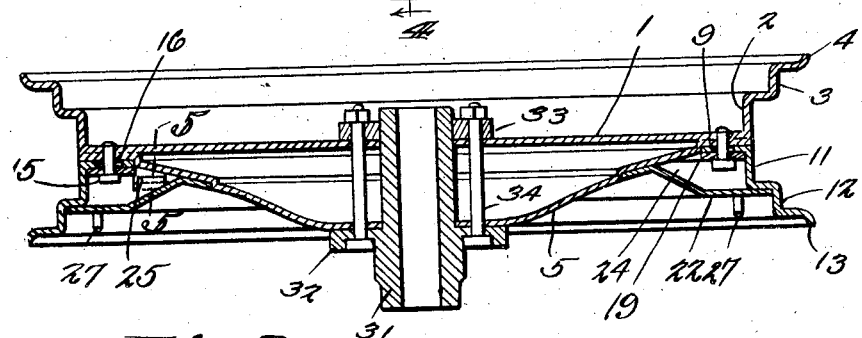
Fig. 2 is a section therethrough on line 2—2, Fig. 1.
Figure 5:
Fig. 5 is a section on line 5—5, Fig. 2.

Referring to the figures by characters of reference 1 designates a flat disk the peripheral portion of which is stepped annularly to provide an inner annular shoulder 2 and an outer annular shoulder 3, the last named shoulder being provided at its outer edge with a laterally turned flange 4. A concavo-convex disk 5 is also provided and is spaced from the disk 1 at its center while the peripheral portion of said disk 5 is formed with an annular depression 6. A portion of the periphery of the disk 5 is cut away to provide an opening 7 and this opening registers with a recess 8 formed in the disk 1, thus to provide a space of sufficient size to receive the stem of the valve of an inner tube. The peripheral portion of the disk 5 is connected to the corresponding portion of the disk 1 preferably by spot welding so that a hollow wheel is thus provided, thicker at its center than at its periphery.

A ring 9 is seated in the depression 6 and has a stepped annular flange 10 forming an inner shoulder 11 and an outer shoulder 12, said outer shoulder being provided at its outer edge with an outwardly turned flange 13. The shoulders 11 and 12 correspond with the shoulders 2 and 3 respectively and the stepped flange coöperates with the flange on the disk 1 to provide an annular tire receiving groove or channel at the periphery of the wheel. A portion of the ring 9 is cut away as indicated at 14 so as to register with the recess 8 and the opening 7.

Extending from the disk 1 adjacent its periphery and at regular intervals are studs 15 having heads, and these studs are adapted to enter openings 16 formed in the ring 9. Studs 17 provided with heads are extended from the ring 9 at desired points and slidably mounted on these studs are the slotted portions 18 of a holding ring 19. This holding ring has key hole slots 20 therein so positioned that when the ring 19 is rotated to bring it to one extreme position on the studs 17 the large ends of the key hole slots 20 will register with the openings 16 and thus allow the heads of the studs 15 to enter the slots 20. With the parts thus located the ring 19 can be rotated in the opposite direction to its extreme position whereupon the narrow portions of the key hole slots 20 will come to position upon the studs 15 and thus prevent said studs from becoming separated from the ring. Consequently the ring 19 and the ring 9 will be held together. Set screws 21 can be provided in the ring 19 for binding on the ring 9, these set screws serving to hold the ring 19 against rotation after it has been adjusted to desired position.

Obviously by shifting the ring 19 so as to bring the large ends of the slots 20 into register with the openings 16, the ring 9 can be readily removed from the wheel, thus to allow a tire to be placed in position. The parts can subsequently be replaced and locked in the manner hereinbefore set forth, thereby to hold the tire securely in place.

For the purpose of protecting the relatively movable parts of the wheel from the action of the elements, a covering ring 22 is mounted on the outer face of the disk 5, the inner periphery of this ring being seated in an annular depression 23 while the outer periphery of the ring bears against the outer side of the shoulder 11. Thus an annular space indicated at 24 is provided between the ring 22 and the ring 19. Ring 22 can be held in position by any suitable means such, for example, as by lugs 25 on the inner face thereof adapted to engage and interfit with lugs 26 formed upon the disk 5. Thus by rotating the ring 22 in one direction the lugs 25 thereon will move into engagement with the lugs 26 whereas by rotating the ring 22 in the opposite direction the lugs will become disengaged and the ring can be removed. Rotation of the ring can be effected in any suitable manner, as by means of projections 27 on the outer face thereof. An opening 28 can be provided in the ring 22 opposite the opening 7, this opening 28 being normally closed by a hinged door 29 having a spring 30 for holding the door normally closed. Thus the end of the stem of the inner tube will be concealed in the space back of the ring 22 and adjacent the opening 28. By opening the door 29 access can be had to the stem and a pump can be connected thereto, as will be obvious.

The hub of the wheel has been indicated at 31 and has a flange 32 which bears against the outer face of the middle portion of disk 5. A ring 33 is mounted on the hub and bears against the outer face of the disk 1, there being bolts 34 extending through the flange 32 and the ring 33 and also through the two disks so as to bind the parts together securely.

What is claimed is:—

1. The combination with a disk having an annular stepped flange at its periphery, of a concavo-convex disk spaced at its center from the other disk, the two disks being welded together adjacent their peripheries, a ring removably mounted on the peripheral portion of the concavo-convex disk and having an annular stepped flange coöperating with the stepped flange on the disk to form an annular tire receiving channel, a locking ring carried by the flanged ring, means on the concavo-convex disk and coöperating with the locking ring for holding the flanged ring in position, means for securing the locking ring in position against relative movement, and a covering ring detachably connected to the concavo-convex disk for concealing the locking ring and that portion of the flanged ring engaged thereby.

2. A wheel including a flat disk having an annular stepped flange, a concavo-convex disk, said disks being spaced apart at their centers to form a hollow wheel and being welded together at their peripheries, studs extending from the peripheral portion of the concavo-convex disk, a ring engaging the studs and having an annular stepped flange coöperating with the flange on the flat disk to form an annular tire receiving channel, a rotatable locking ring mounted on the studs and having key hole slots for receiving the studs, means carried by the concavo-convex disk and engaging the locking ring to hold said ring against rotation, a covering ring engaging the concavo-convex disk and the flange on the removable ring for concealing the locking ring and the parts engaged thereby, there being an opening in the disk and communicating with the space between the covering ring and the concavo-convex disk for the reception of the valve stem of an inner tube, and a normally closed door giving access to said space adjacent the opening.

3. A wheel including a flat disk having an annular stepped flange, a concavo-convex disk welded to the flat disk at the periphery thereof and the two disks being spaced apart at their centers, a flanged ring, a covering ring, means for detachably connecting the covering and flanged ring to the disks, and a hub secured within the disks.

4. A wheel including a flat disk having an annular stepped flange, a concavo-convex disk welded to the flat disk at the periphery thereof and the two disks being spaced apart at their centers, a flanged ring, a covering ring, means for detachably connecting the covering and flanged ring to the disks, there being an annular space between the flanged ring and the covering ring, and an opening in the disks extending to said space for the reception of the valve stem of a tire tube, and a normally shut closure upon the covering ring giving access to said space adjacent the stem receiving opening.

In testimony that I claim the foregoing as my own, I have hereto affixed my signature in the presence of two witnesses.

ROSCOE CONKLIN RACER.

Witnesses:
 R. W. BAUER,
 W. A. COPE.